US012423883B2

(12) United States Patent
Goldberg et al.

(10) Patent No.: US 12,423,883 B2
(45) Date of Patent: Sep. 23, 2025

(54) DYNAMIC SCALE AUGMENTED REALITY ENHANCEMENT OF IMAGES

(71) Applicant: Disney Enterprises, Inc., Burbank, CA (US)

(72) Inventors: Evan M. Goldberg, Burbank, CA (US); Jackson Aaron Rogow, Los Angeles, CA (US); Alexandra Christiansen, Van Nuys, CA (US)

(73) Assignee: Disney Enterprises, Inc., Burbank, CA (US)

( * ) Notice: Subject to any disclaimer, the term of this patent is extended or adjusted under 35 U.S.C. 154(b) by 75 days.

(21) Appl. No.: 17/887,754

(22) Filed: Aug. 15, 2022

(65) Prior Publication Data

US 2024/0054696 A1  Feb. 15, 2024

(51) Int. Cl.
*G06T 19/00* (2011.01)
*G06T 11/00* (2006.01)

(52) U.S. Cl.
CPC .......... *G06T 11/001* (2013.01); *G06T 19/006* (2013.01)

(58) Field of Classification Search
None
See application file for complete search history.

(56) References Cited

U.S. PATENT DOCUMENTS

| 9,355,617 | B2 * | 5/2016 | Izumihara | G06F 3/017 |
|---|---|---|---|---|
| 10,078,917 | B1 | 9/2018 | Gaeta et al. | |
| 10,140,773 | B2 | 11/2018 | Short | |
| 10,930,076 | B2 | 2/2021 | Bastov | |
| 11,238,656 | B1 | 2/2022 | Lin et al. | |
| 11,263,816 | B2 | 3/2022 | Ballard | |
| 2002/0089530 | A1 | 7/2002 | Markel | |
| 2009/0024617 | A1 | 1/2009 | Cope | |

(Continued)

FOREIGN PATENT DOCUMENTS

| EP | 3 121 688 A1 | 1/2017 |
|---|---|---|
| EP | 3121688 | 1/2017 |

(Continued)

OTHER PUBLICATIONS

International Search Report and Written Opinion dated Sep. 26, 2023 for International Application PCT/US2023/025471.

(Continued)

*Primary Examiner* — Nicholas R Wilson
(74) *Attorney, Agent, or Firm* — Farjami & Farjami LLP

(57) ABSTRACT

A system includes an augmented reality (AR) device having a display, processing hardware, and a memory storing software code. The processing hardware executes the software code to monitor media content including a sequence of images displayed on a display screen separate from the AR device, detect, based on monitoring the media content, an image in the sequence of images as an anchor image, and obtain, using the anchor image, one or more AR effect(s) associated with the anchor image. The processing hardware further executes the software code to determine a position and orientation of the AR device in relation to the display screen, and render, based on that position and orientation, the AR effect(s) on the display of the AR device, where the AR effect(s) include at least one intermediate scale AR effect having a scale intermediate between a display screen scale AR effect and a real-world scale AR effect.

20 Claims, 8 Drawing Sheets

(56) References Cited

U.S. PATENT DOCUMENTS

| | | | |
|---|---|---|---|
| 2010/0053164 A1* | 3/2010 | Imai | G06F 3/147 |
| | | | 345/1.3 |
| 2011/0285704 A1* | 11/2011 | Takeda | H04N 21/4854 |
| | | | 345/419 |
| 2012/0127284 A1 | 5/2012 | Bar-Zeev et al. | |
| 2014/0267228 A1 | 9/2014 | Ofek | |
| 2016/0163063 A1 | 6/2016 | Ashman | |
| 2018/0191769 A1 | 7/2018 | Anderson | |
| 2018/0367835 A1 | 12/2018 | Hamidi-Rad et al. | |
| 2019/0222776 A1 | 7/2019 | Carter et al. | |
| 2020/0035025 A1 | 1/2020 | Crocker et al. | |
| 2020/0260154 A1 | 8/2020 | Comito et al. | |
| 2020/0294313 A1 | 9/2020 | Arroyo Palacios et al. | |
| 2020/0342231 A1 | 10/2020 | Richter et al. | |
| 2020/0364937 A1 | 11/2020 | Selbrede | |
| 2021/0096638 A1 | 4/2021 | O'Hern et al. | |
| 2021/0150212 A1 | 5/2021 | Richey | |
| 2021/0209364 A1* | 7/2021 | Park | G06T 19/006 |
| 2021/0263587 A1 | 8/2021 | Zhu | |
| 2021/0326594 A1 | 10/2021 | Costello et al. | |
| 2022/0005322 A1 | 1/2022 | Pilnock et al. | |
| 2023/0206568 A1* | 6/2023 | Du | G06T 19/20 |
| | | | 345/426 |
| 2023/0316683 A1 | 10/2023 | Hare et al. | |

FOREIGN PATENT DOCUMENTS

| | | |
|---|---|---|
| WO | WO 2014182545 A1 | 11/2014 |
| WO | 2015192117 | 12/2015 |
| WO | WO 2015/192117 A1 | 12/2015 |

OTHER PUBLICATIONS

International Search Report and Written Opinion dated Sep. 18, 2023 for International Application PCT/US2023/025477.

Yuki Kawamura, Kazuhiro Otsuki "3D Free-viewpoint Augmented Reality on a Second Display Synchronized with a Broadcast Program" ICCIP '18: Proceedings of the 4th International Conference on Communication and Information Processing Nov. 2, 2018 pp. 273-277.

Alexander James Faaborg, Shengzhi Wu "Methods and Apparatus to Scale Annotations For Desirable Viewing in Augmented Reality Environments" Technical Disclosure Commons. Defensive Publications Series. Apr. 2020 31 Pgs.

"Scale: How to suggest the scale of objects and environments" Mar. 11, 2022 4 Pgs.

"Scaling Objects for the Real World" 2022 6 Pgs.

File History of U.S. Appl. No. 17/887,731, filed Aug. 15, 2022.

File History of U.S. Appl. No. 17/887,742, filed Aug. 15, 2022.

\* cited by examiner

DYNAMIC SCALE AUGMENTED REALITY ENHANCEMENT OF IMAGES

BACKGROUND

Advances in computer technology and software have made possible the generation of richly featured augmented reality (AR) experiences for users. AR experiences can merge virtual objects or characters with real-world features in a way that can, in principle, provide a powerfully interactive experience. AR can further be used to extend content from displays such as TV screens into people's homes and personal environments.

However, one limitation associated with conventional approaches to generating screen extension AR imagery is determining the appropriate scale for each AR effect. That is to say, if an AR effect conforms to the scale of a real-world object, it may not match that of the display elements. If the AR effect conforms to the scale of the display elements, the AR effect may be inappropriately sized relative to its real-world counterparts. In either instance, such mismatches significantly reduce the apparent realism of the AR enhanced content to a user. Consequently, there is a need in the art for systems and methods designed to generate augmented reality imagery having enhanced realism, such that blending of a virtual object with both display extension (e.g., TV screen extension) and real-world features presents a user with a pleasing and convincing simulation of events.

DETAILED DESCRIPTION

Figure 1:
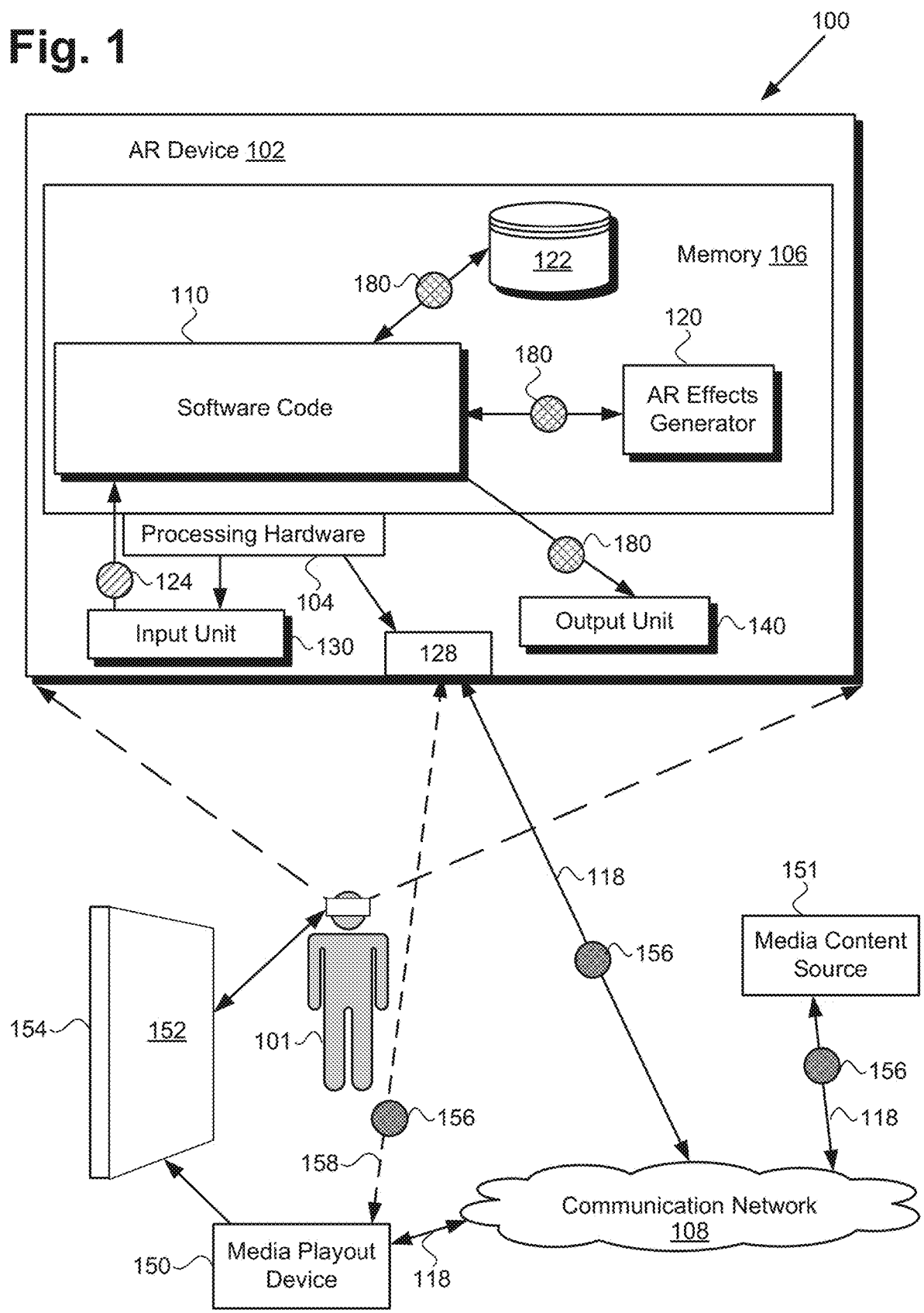
FIG. 1 shows an exemplary system for providing dynamic scale augmented reality (AR) enhancement of images, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing dynamic scale augmented reality (AR) enhancement of images. It is noted that, as defined herein, the term "anchor image" refers to an image serving as a two-dimensional (2D) image template upon which one or more AR effects may be overlaid, or from which one or more AR effects may extend into an environment in which a display screen displaying the anchor image is located. In various use cases, an anchor image may be a single video frame in its entirety, an image included in a portion of a single video frame that is less than the entire video frame, or to a sequence of multiple video frames.

It is also noted that, as defined in the present application, the expression "dynamic scale" and "dynamic scaling" refer to the rendering of AR effects as one or more of display screen scale AR effects, real-world scale AR effects, or intermediate scale AR effects having a scale intermediate between display screen scale AR effects and real-world scale AR effects. Display screen scale AR effects are AR effects that are scaled to substantially match the scale of imagery in a sequence of images being displayed on a display screen and to which the display screen scale AR effects correspond or are used to enhance. Moreover, display screen scale AR effects are typically spatially and temporally aligned with the sequence of images being displayed on the display screen.

By contrast, real-world scale AR effects are AR effects that are scaled so as to display verisimilitude with respect to the real-world objects they depict. i.e., a real-world AR effect boulder or tree appearing to have the size of a real-world boulder or tree. Thus real-world AR effects are larger than display screen scale AR effects, while intermediate scale AR effects are both larger than display screen AR effects and smaller than real-world AR effects. Intermediate scale AR effects are scaled to appear larger with increasing distance from a display screen displaying a sequence of images to which the real-world AR effects correspond, as well as to appear larger with increased proximity to a user of the AR device rendering the intermediate scale AR effects. With respect to the systems and methods described in the present application, it is noted that the dynamic scale AR enhancement solution disclosed herein may be implemented as automated systems and methods.

As used in the present application, the terms "automation," "automated," and "automating" refer to systems and processes that do not require the participation of a human administrator. Although in some implementations the dynamic scale AR enhancements provided by the systems and methods disclosed herein may be reviewed or even modified by a human editor or system administrator, that human involvement is optional. Thus, the methods described in the present application may be performed under the control of hardware processing components of the disclosed systems.

FIG. 1 shows exemplary system 100 configured to provide dynamic scale AR enhancement of images, according to one implementation. System 100 includes AR device 102 having processing hardware 104, input unit 130, output unit 140, transceiver 128, and memory 106 implemented as a computer-readable non-transitory storage medium. As shown in FIG. 1, according to the present exemplary implementation, memory 106 stores software code 110, optional AR effects generator 120, and optional AR effects database 122.

As further shown in FIG. 1, system 100 is implemented within a use environment including user 101 of AR device 102, media content 152 including a sequence of images displayed on display screen 154, media playout device 150 playing out media content 152 being displayed on display screen 154, media content source 151, and communication network 108. In addition. FIG. 1 shows location data 124 for use in determining the position and orientation of AR device 102 in relation to display screen 154, one or more AR effects 180 (hereinafter "AR effect(s) 180") obtained by software code 110 from one of both of AR effects generator 120 or AR effects database 122, and media playout data 156 indicating one or more of the playhead state of media playout device 150 or one or more display parameters of display screen 154. Also shown in FIG. 1 is wireless communication link 158 between AR device 102 and media playout device 150, as well as network communication links 118 of communication network 108, which may be used by AR device 102 to interactively connect with one or both of media playout device 150 and media content source 151.

Although FIG. 1 depicts AR effects generator 120 and AR effects database 122 as being elements of AR device 102, stored in memory 106, that representation is merely exemplary. In other implementations, one or both of AR effects generator 120 and AR effects database 122 may be omitted from AR device 102, but may be accessible to AR device 102 via communication network 108 and network communication links 118 as remote resources.

Moreover, although the present application refers to software code 110 and one or both of AR effects generator 120 and AR effects database 122 as being stored in memory 106 for conceptual clarity, more generally, memory 106 may take the form of any computer-readable non-transitory storage medium. The expression "computer-readable non-transitory storage medium." as defined in the present application, refers to any medium, excluding a carrier wave or other transitory signal that provides instructions to processing hardware 104 of AR device 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs. RAM, programmable read-only memory (PROM), erasable PROM (EPROM), and FLASH memory.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of AR device 102, as well as a Control Unit (CU) for retrieving programs, such as software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

As defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to a NN that utilizes multiple hidden layers between input and output layers, which may allow for learning based on features not explicitly defined in raw data.

Transceiver 128 of system 100 may be implemented as any suitable wireless communication unit. For example, transceiver 128 may be implemented as a fourth generation (4G) wireless transceiver, or as a 5G wireless transceiver. In addition, or alternatively, transceiver 128 may be configured for communications using one or more of Wireless Fidelity (Wi-Fi), Worldwide Interoperability for Microwave Access (WiMAX), Bluetooth, Bluetooth low energy. ZigBee, radio-frequency identification (RFID), near-field communication (NFC), and 60 GHz wireless communications methods.

Figure 2A:
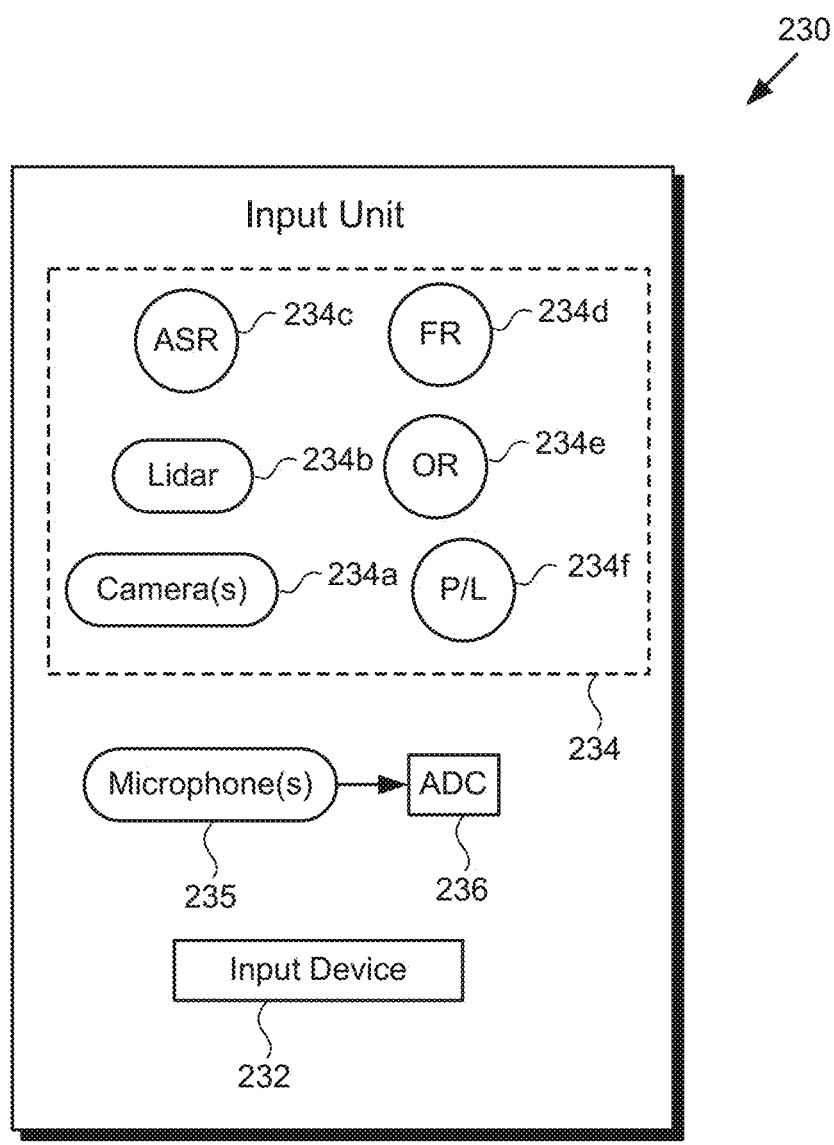
FIG. 2A shows a more detailed diagram of an input unit suitable for use as a component of the system shown in FIG. 1, according to one implementation.

FIG. 2A shows a more detailed diagram of input unit 230 suitable for use as a component of AR device 102, in FIG. 1, according to one implementation. As shown in FIG. 2A, input unit 230 may include input device 232, such as a touchscreen or keyboard for example, as well as multiple sensors, sensing modules, or sensors and sensing modules 234 (hereinafter "sensors/sensing modules 234"), one or more microphones 235 (hereinafter "microphone(s) 235"), and analog-to-digital converter (ADC) 236. As further shown in FIG. 2A, sensors/sensing modules 234 of input unit 230 may include one or more cameras 234a (hereinafter "camera(s) 234a"), laser imaging, detection, and ranging (lidar) detector 234b, automatic speech recognition (ASR) module 234c, facial recognition (FR) module 234d, object recognition (OR) module 234e, and one or more position/location sensors 234f (hereinafter "P/L sensor(s) 234f").

Camera(s) 234a may include various types of cameras, such as one or more red-green-blue (RGB) still image cameras, video cameras. RGB-D cameras that include a depth sensor, and infrared (IR) cameras, or combinations thereof to name a few examples. P/L sensor(s) 234f may include one or more accelerometers, one or more gyroscopes, a Global Positioning System (GPS) receiver, a magnetometer, or any combination of such features, for example. In some implementations. P/L sensor(s) 234f may be implemented as an inertial measurement unit (IMU).

Input unit 230 corresponds in general to input unit 130, in FIG. 1. Thus, input unit 130 may share any of the characteristics attributed to input unit 230 by the present disclosure, and vice versa. It is noted that the specific sensors/sensing modules shown to be included among sensors/sensing modules 234 of input unit 130/230 are merely exemplary, and in other implementations, sensors/sensing modules 234 of input unit 130/230 may include more, or fewer, sensors/sensing modules than camera(s) 234a, lidar detector 234b, ASR module 234c. FR module 234d. OR module 234e, and P/L sensor(s) 234f. For example, in addition to, or as alternatives to the specific sensors/sensing modules shown in FIG. 2A, input unit 130/230 may include sensors/sensing modules for detecting one or more of color, ambient light, temperature, and atmospheric pressure, to name a few.

Figure 2B:
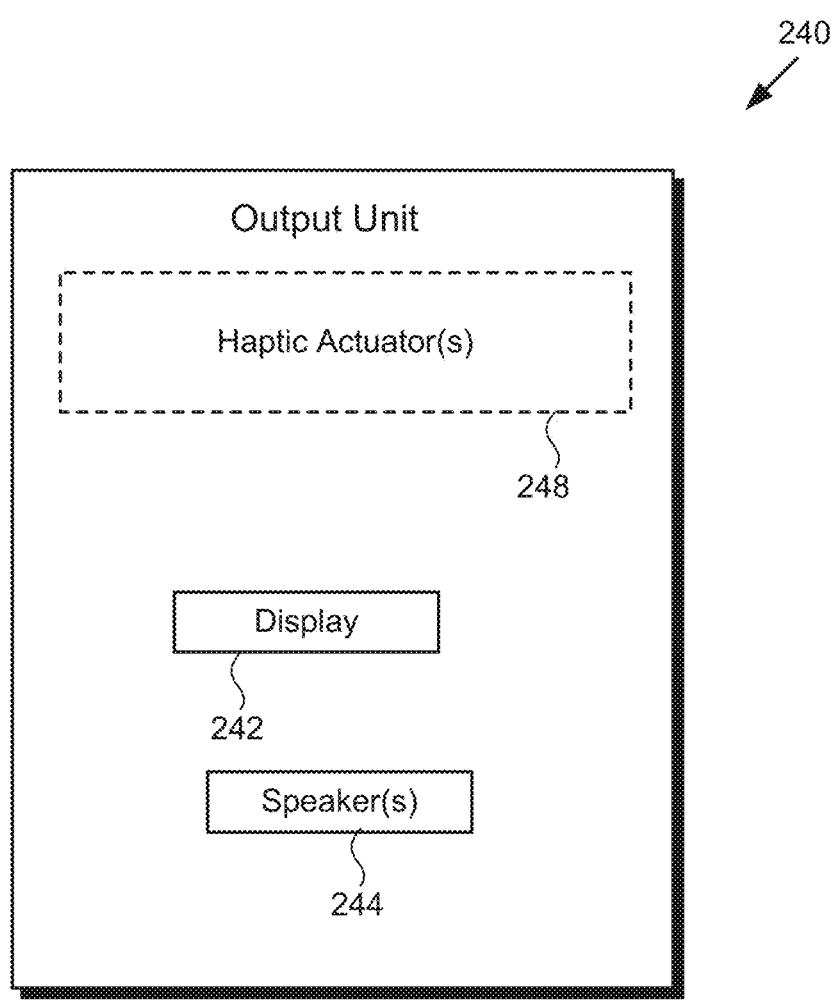
FIG. 2B shows a more detailed diagram of an output unit suitable for use as a component of the system shown in FIG. 1, according to one implementation.

FIG. 2B shows a more detailed diagram of output unit 240 suitable for use as a component of AR device 102, in FIG. 1, according to one implementation. As shown in FIG. 2B, output unit 240 may include display 242 and one or more audio speakers 244 (hereinafter "audio speaker(s) 244"). As further shown in FIG. 2B, in some implementations, output unit 240 may include one or more haptic actuators 248 (hereinafter "haptic actuator(s) 248"). Display 242 may be implemented as a liquid crystal display (LCD), a light-emitting diode (LED) display, an organic light-emitting diode (OLED) display, a quantum dot (QD) display, or any other suitable display screen that performs a physical transformation of signals to light.

Output unit 240 corresponds in general to output unit 140, in FIG. 1. Thus, output unit 140 may share any of the characteristics attributed to output unit 240 by the present disclosure, and vice versa. It is noted that the specific features shown to be included in output unit 140/240 are merely exemplary, and in other implementations, output unit 140/240 may include more, or fewer, features than display 242, audio speaker(s) 244, and haptic actuator(s) 248.

Figure 3:
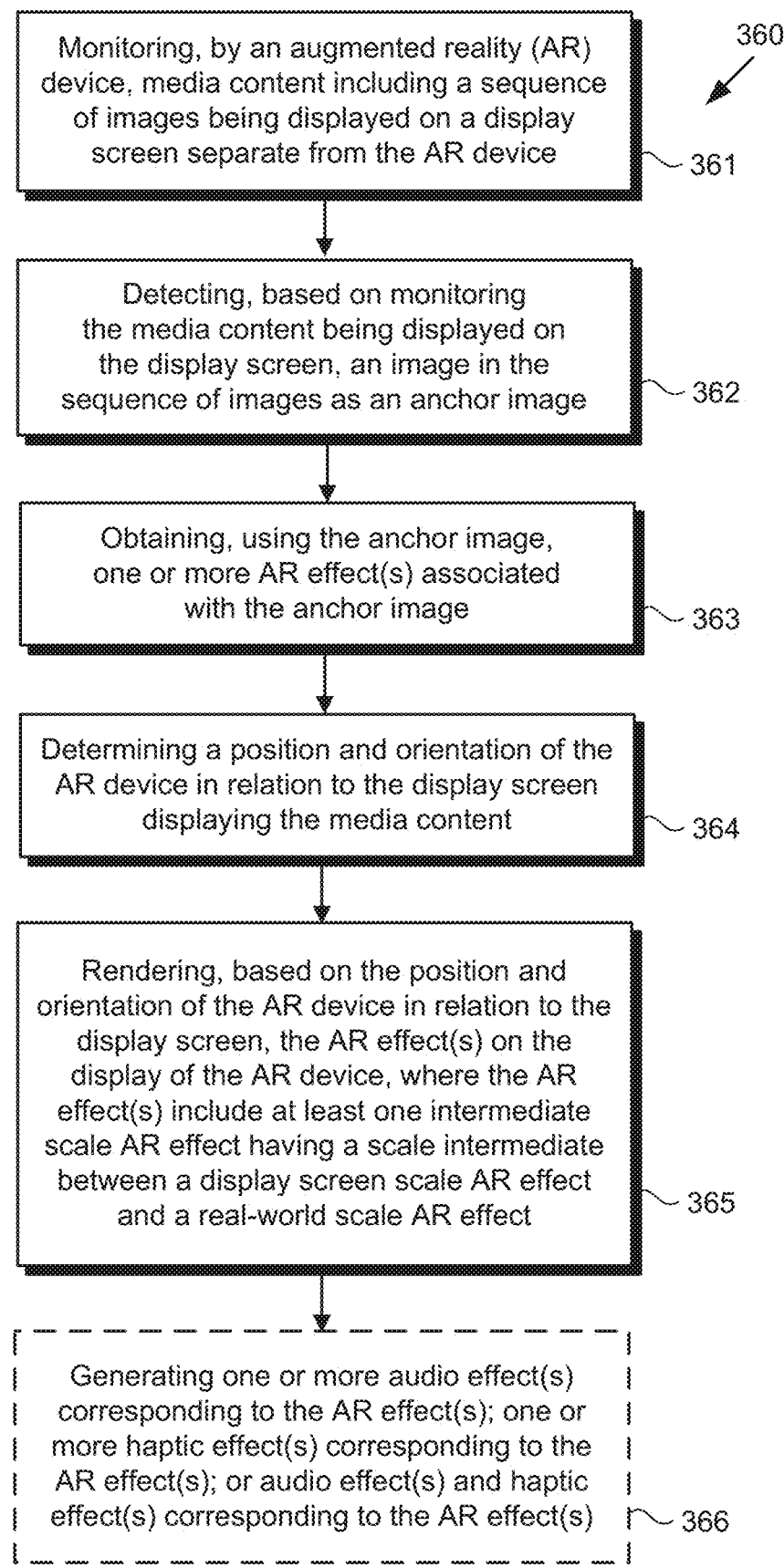
FIG. 3 shows a flowchart presenting an exemplary method for use by a system to provide dynamic scale AR enhancement of images, according to one implementation.

The functionality of system 100 will be further described by reference to FIG. 3. FIG. 3 shows flowchart 360 presenting an exemplary method for use by system 100 to provide dynamic scale AR enhancement of images, according to one implementation. With respect to the method outlined in FIG. 3, it is noted that certain details and features have been left out of flowchart 360 in order not to obscure the discussion of the inventive features in the present application.

Referring to FIG. 3, with further reference to FIGS. 1 and 2A, flowchart 360 includes monitoring media content 152 including a sequence of images being displayed on display screen 154 separate from AR device 102 (action 361). Monitoring of media content 152 in action 361 may include using one or more sensors/sensing modules 234. In one example, monitoring of media content 152 in action 361 may include using camera(s) 234a to capture imagery of the sequence of images being displayed on display screen 154.

In some implementations, action 361 may further include receiving media playout data 156 indicating a playhead state of media playout device 150 playing media content 152 that is being displayed on display screen 154. In some implementations, that media playout data 156 may take the form of audio data output by media playout device 150 during playout of media content 152 being displayed on display screen 154, and may be received using microphone(s) 235. However, in other implementations, media playout data 156 may be included in an inaudible wireless communication from media playout device 150 during playout of media content 152 being displayed on display screen 154, and may be received using transceiver 128 via wireless communication link 158. In yet other implementations, media playout data 156 may be received from remote media content source 151 of media content 152 being displayed on display screen 154, via communication network 108 and network communication links 118.

Media playout data 156 would typically indicate the present playback state of media playout device 150, such as play, pause, fast forward, or rewind, for example, and may further indicate a timestamp or video frame number of the one of the sequence of images presently being displayed on display screen 154. In addition, or alternatively, media playout data 156 may include one or more of a variety of display parameters of display screen 154, such as hue, saturation, brightness, contrast, and tint of display screen 154, for example. Action 361 may be performed by software code 110, executed by processing hardware 104 of AR device 102, and using features of input unit 130/230 described above.

Continuing to refer to FIGS. 1, 2A, and FIG. 3 in combination, flowchart 360 further includes detecting, based on monitoring media content 152, an image in the sequence of images being displayed on display screen 154, as an anchor image (action 362). As defined above, the term "anchor image" refers to an image serving as a 2D image template upon which one or more AR effects may be overlaid, or from which one or more AR effects may extend into an environment in which display screen 154 displaying the anchor image is located. In various use cases, such an anchor image may be a single video frame of the sequence of images being displayed on display screen 154, an image included in a portion of a single video frame of the sequence of images being displayed on display screen 154 that is less than the entire video frame, or to a sequence including one or more video frames, one or more portions of video frames, or a combination of one or more video frames with one or more portions of video frames within the sequence of images being displayed on display screen 154. It is noted that anchor images are described in detail in U.S. patent application Ser. No. 17/887,731, titled "Augmented Reality Enhancement of Moving Images," filed concurrently with the present application, and hereby incorporated fully by reference into the present application.

Figure 4:
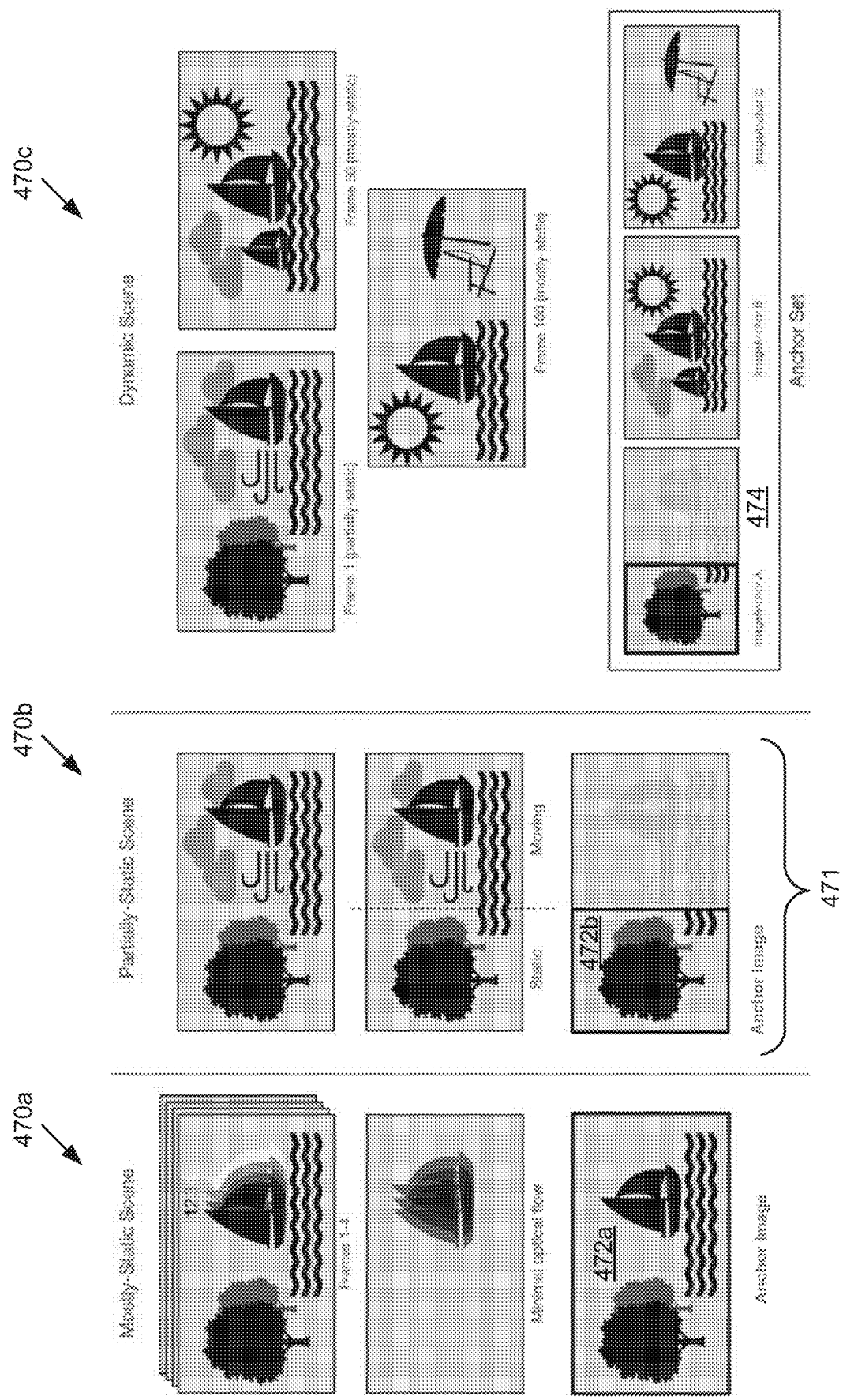
FIG. 4 shows respective diagrams depicting three exemplary use cases identifying one or more anchor images for use in providing dynamic scale AR enhancement of images, according to various implementations.

FIG. 4 shows respective diagrams 470a, 470b, and 470c depicting three exemplary use cases identifying anchor images for use in providing dynamic scale AR enhancement of images, according to various implementations. As shown by diagram 470a, where a scene including multiple images includes only video frames that are substantially static, i.e., remain substantially the same from video frame to video frame, any one of the video frames within that scene may serve as anchor image 472a. That is to say, anchor image 472a is the entire video frame that includes the mostly static boat, water, and tree. It is noted that, as used in the present application, the term "scene," as applied to video content, is a shot or series of shots that together deliver a single, complete and unified dramatic element of film narration, or block of storytelling within a film. Moreover, as used in the present application, the term "shot" refers to a sequence of frames of video that are captured from a unique camera perspective without cuts or other cinematic transitions.

As further shown by diagram 470b, where a scene including multiple images includes video frames that are partially-static, i.e., change from video frame to video frame but include some imagery that is substantially static from video frame to video frame, that static imagery portion of any one of the video frames within that scene may serve as anchor image 472b. That is to say, anchor image 472b includes only the tree portion of video frame 471.

As yet further shown by diagram 470c, where a scene including multiple images includes video frames that are dynamic, i.e., video frames including imagery that changes substantially from video frame to video frame, a subset of multiple frames, portions of video frames, or both, may serve as anchor set of images 474. That is to say, in some implementations, the anchor image may include multiple images. With respect to the expression "imagery that changes substantially from video frame to video frame," that expression refers to change of the composition as a whole of the imagery from frame-to-frame. In diagram 470c, for example, the boat changes location from frame right, to frame center, to frame left, while other features, such as a tree, umbrella, and chair move and appear or disappear at different timestamps.

In some implementations, the anchor image detected in action 362 may be manually predetermined. However, in other implementations, the anchor image detected in action 362 may be detected algorithmically by AR device 102 during playout of media content 152 being displayed on display screen 154. Action 362 may be performed by software code 110, executed by processing hardware 104 of AR device 102. It is noted that although flowchart 360 lists action 362 as following action 361, that representation is merely exemplary. In various implementations, actions 361 and 362 may be performed in parallel, i.e., contemporaneously with another.

Flowchart 360 further includes obtaining, using the anchor image detected in action 362, AR effect(s) 180 associated with the anchor image (action 363). It is noted that AR effect(s) 180 are "associated" with the anchor image by virtue of their ability to enhance or supplement objects or characters shown by the anchor image. Identification of the anchor image can trigger the rendering of AR effect(s) 180 described below. In addition, AR effect(s) 180 may be scaled based on the scale of imagery shown by the anchor image.

Referring to FIG. 1, in some implementations, one or more of AR effect(s) 180 may be predetermined and stored in AR effects database 122. In those implementations, the one or more of predetermined AR effect(s) 180 may be obtained in action 363 by being retrieved from AR effects database 122. However, in other implementations, one or more of AR effect(s) 180 may be obtained in action 363 by being generated by AR device 102 using AR effects generator 120. Whether AR effect(s) 180 is/are obtained by being retrieved from AR effects database 122, by being generated using AR effects generator 120, or both, action 363 may be performed by software code 110, executed by processing hardware 104 of AR device 102.

Flowchart 360 further includes determining the position and orientation of AR device 102 in relation to display screen 154 displaying media content 152 (action 364). Action 364 may include using one or more of lidar detector 234b, OR module 234e, P/L sensor(s) 234f, or microphone (s) 235 to provide location data 124 for use in determining a position and orientation of AR device 102 in relation to display screen 154, such a distance of AR device 102 from display screen 154 and a viewing angle of AR device 102 in relation to display surface of display screen 154. Moreover, where location data 124 includes audio data obtained by microphone(s) 235 as a result of monitoring media content 152, location data 124 may further include microphone metadata describing the angle of arrival of sound at microphone(s) 235. Action 364 may be performed by software code 110, executed by processing hardware 104 of AR device 102a, and using features of input unit 130/230 described above.

Referring to FIGS. 1, 2B, and FIG. 3 in combination, flowchart 360 further includes rendering, based on the position and orientation of AR device 102 in relation to display screen 154, AR effect(s) 180 on display 242 of AR device 102, wherein AR effect(s) 180 include at least one intermediate scale AR effect having a scale larger than the scale of a display screen scale AR effect and smaller than the scale of a real-world scale AR effect, as those features are defined above (action 365). It is noted that AR effect(s) 180 include at least one AR effect in the form of an intermediate scale AR effect, but may include multiple AR effects including one or more display screen scale AR effects in addition to the at least on intermediate scale AR effect, one or more real-world scale AR effects in addition to the at least one intermediate scale AR effect, or one or more display screen scale AR effect and one or more real-world scale AR effect in addition to the intermediate scale AR effect. Action 365 may be performed by software code 110, executed by processing hardware 104 of AR device 102.

The display screen scale may be computed based on the perceived scale of objects on display screen 154. In a wide shot of a landscape, for example, everything appears small on the display screen 154, but may be enlarged using the dimensions of display screen 154 to produce the display screen scale AR effect or effects such that if a display screen scale AR effect were exactly positioned on top of the same element on display screen 154, it would be the same size. By contrast, real-world scale AR effects are just that. e.g., a real-world scale AR yard stick would be 3 feet, a real-world scale AR football field would be 100 yards, and so forth. As noted above, the intermediate scale AR effect is an interpolation of the display screen scale and real-world scale based on the position of the AR device 102 in relation to display screen 154, and further modified by the glancing angle of the viewer of AR device 102.

As noted above, in some implementations, AR device 102 may receive media playout data 156 including one or more of a variety of display parameters of display screen 154, such as hue, saturation, brightness, contrast, and tint of display screen 154, for example. In those implementations, processing hardware 104 of AR device 102 may execute software code 110 to receive the one or more display parameters of display screen 154, and to render one or more display screen scale AR effects included among AR effect(s) 180 using the display parameters of display screen 154. By way of example, processing hardware 104 of AR device 102 may execute software code 110 to use the one or more display parameters of display screen 154 to adjust display parameters of display 242 of AR device 102 such that display screen scale AR effects included among AR effect(s) 180 are rendered so as to complement or contrast with media content 152 being displayed on display screen 154.

Alternatively, or in addition, in some implementations, processing hardware 104 of AR device 102 may execute software code 110 to detect a color palette of the real-world environment of display screen 154 displaying media content 152, such as colors included in wallpaper, paint, wall or floor coverings, for example, of a room in which display screen 154 is located. In implementations in which a color palette of the real-world environment of display screen 154 is detected, that detection may performed using camera(s) 234a and a color sensing module optionally included among sensors/sensing modules 234 in FIG. 2A. In those implementations, processing hardware 104 of AR device 102 may execute software code 110 to adjust display parameters of display 242 of AR device 102 such that one or more intermediate scale AR effects included among AR effect(s) 180 are rendered on display 242 of AR device 102 using the detected color palette. It is noted that, in some implementations, the influence of such a detected color palette on the rendering of intermediate scale AR effects may diminish as the scale of the intermediate scale AR effects approaches real-world scale.

Figure 5A:
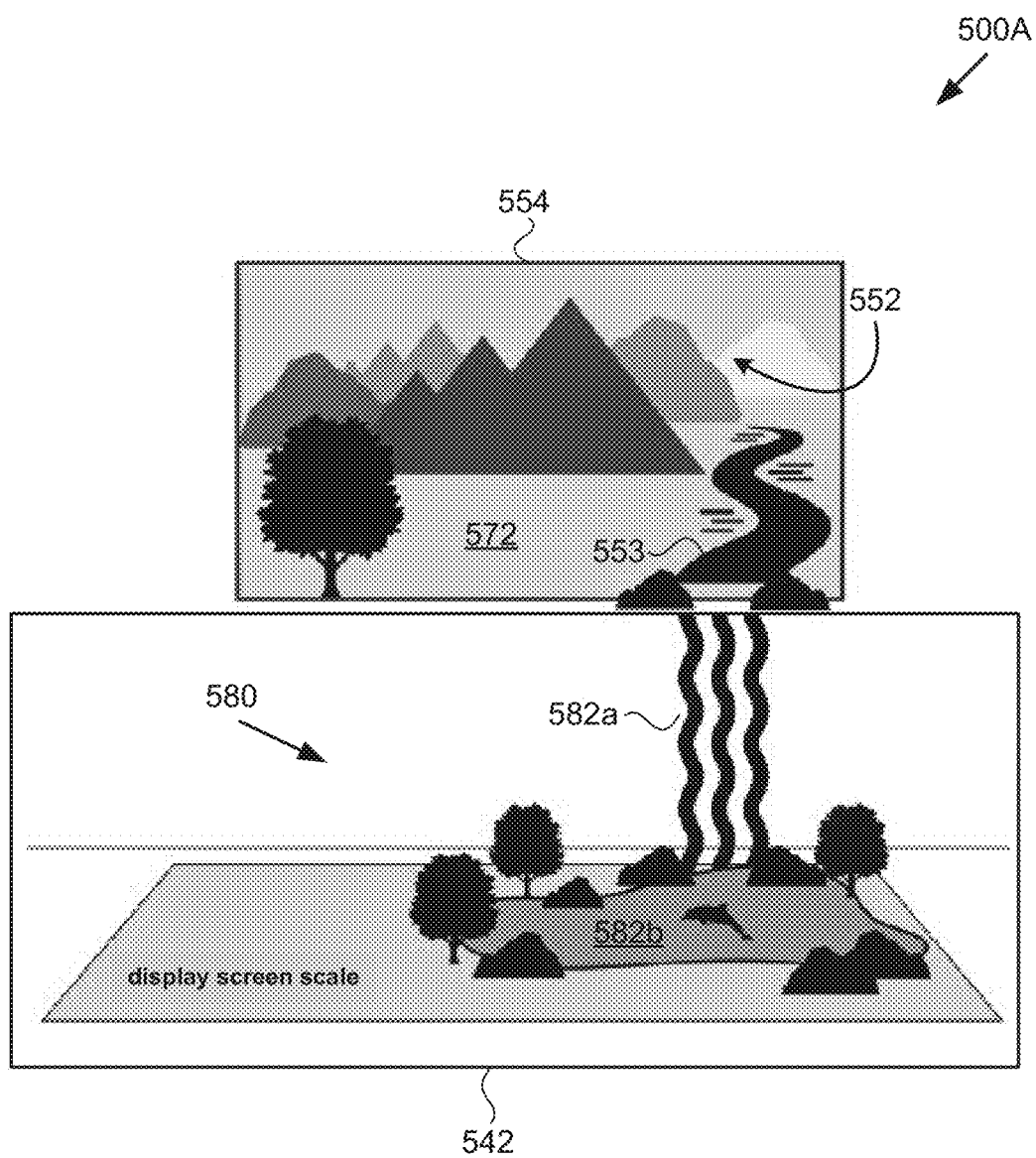
FIG. 5A shows a diagram depicting display screen scale AR enhancement of media content including images, according to one implementation.

FIG. 5A shows diagram 500A depicting dynamic scale AR enhancement of media content 552 including anchor image 572, according to one implementation. As shown in FIG. 5A, anchor image 572 of media content 552 is being displayed on display screen 554, and is enhanced by AR effects 580 rendered on display 542 of an AR device. As further shown in FIG. 5, AR effects 580 include display screen scale AR effect 582a in the form of a waterfall, and display screen scale AR effect 582b in the form of a plunge pool at the base of the waterfall. Also shown in FIG. 5A is river 553 of media content 552, displayed using a sequence of images on display screen 554.

Media content 552, display screen 554, and AR effects 580 correspond respectively to media content 152, display screen 154, and AR effect(s) 180, in FIG. 1. That is to say, media content 152, display screen 154, and AR effect(s) 180, may share any of the characteristics attributed to respective media content 552, display screen 554, and AR effects 580 by the present disclosure, and vice versa. In addition, anchor image 572 corresponds in general to anchor image 472a, in FIG. 4, and those corresponding features may share any of the characteristics attributed to either of those corresponding features by the present disclosure. Moreover, display 542, corresponds in general to display 242 of AR device 102, and those corresponding features may share any of the characteristics attributed to either of those corresponding features by the present disclosure.

It is noted that display screen scale AR effects 582a and 582b are spatially aligned with anchor image 572 being displayed on display screen 154/554 such that river 553 appears to generate display screen scale AR effects 582a and 582b. It is further noted that display screen scale AR effects 582a and 582b are temporally aligned with anchor image 572 being displayed on display screen 154/554 such that the flow rate of river 553 appears to correspond to the volume of water falling into display screen scale AR effect 582b. Furthermore, display screen scale AR effects 582a and 582b are temporally aligned with the sequence of images being displayed on display screen 154/554 in that display screen scale AR effects 582a and 582b appear and disappear contemporaneously with river 553 to which they correspond.

Figure 5B:
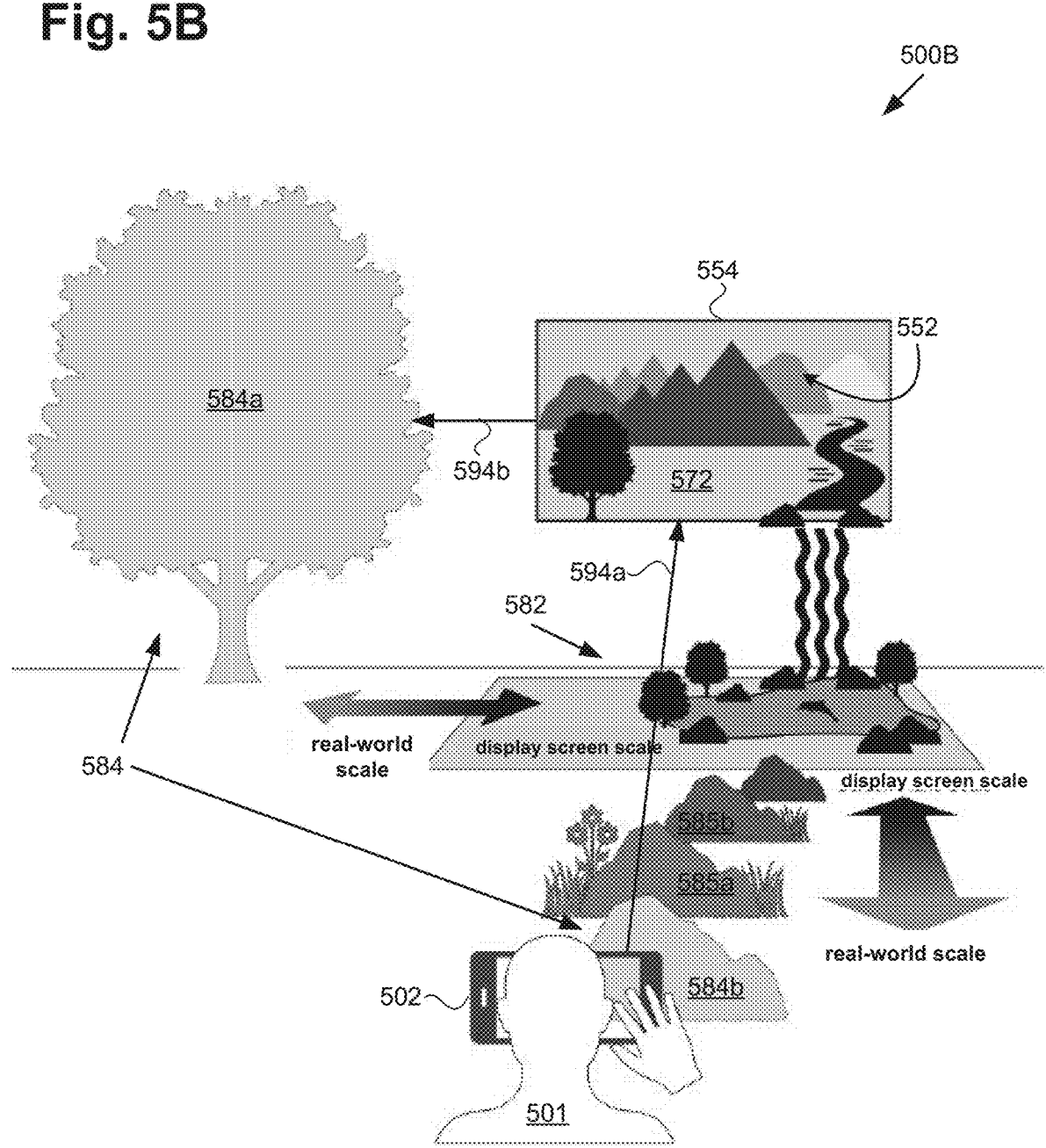
FIG. 5B shows an exemplary diagram depicting dynamic scale AR enhancement of media content including images, based on a first position and orientation of an AR device.
Figure 5C:
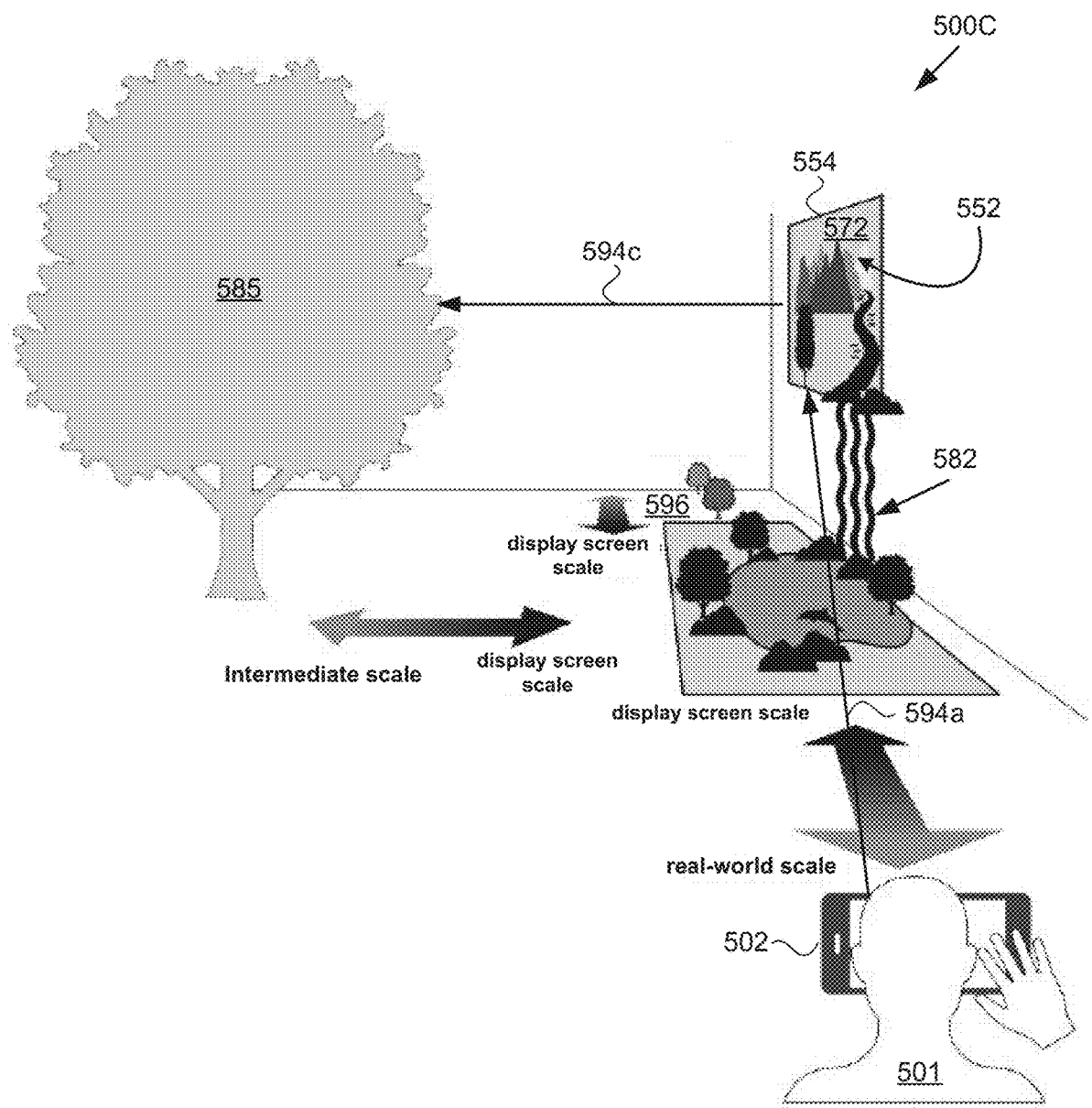
FIG. 5C shows an exemplary diagram depicting dynamic scale AR enhancement of media content including images, based on a second position and orientation of the AR device of FIG. 5B.

Referring to FIGS. 5B and 5C. FIG. 5B shows exemplary diagram 500B depicting dynamic scale AR enhancement of media content including images, based on a first position and orientation of an AR device, while FIG. 5C shows exemplary diagram 500C depicting dynamic scale AR enhancement of media content including images, based on a second position and orientation of the AR device of FIG. 5B. It is noted that any features identified by the same reference number in any of FIGS. 5A, 5B, and 5C correspond respectively to one another, and may share any of the characteristics attributed to that feature in the present disclosure.

Diagram 500B, in FIG. 5B, shows AR device 502 at distance 594a from display screen 554 displaying media content 552, as well as user 501 of AR device 502. In addition to being situated at distance 594a from display screen 554, the position of AR device 502 in relation to display screen 554 is characterized by a viewing angle of substantially ninety degrees (90°). i.e., perpendicular, to the display surface of display screen 554.594b It is noted that, as defined in the present application, the expression "viewing angle" refers to the angle between a line projected from a camera lens of AR device 502 to the display surface of display screen 554 and a plane corresponding to that display surface of display screen 554.

Referring to FIG. 5B in combination with FIGS. 1 and 5A, under the circumstances depicted in FIG. 5B. AR device 502 may dynamically generate AR effect(s) 180/580 in FIGS. 1 and 5A that include one or more display screen scale AR effects 582 corresponding to display screen AR effects 582a and 582b, in FIG. 5A, one or more real-world scale AR effects 584, and one or more intermediate scale AR effects 585a and 585b. It is noted that according to the use case shown in FIG. 5B, real-world scale AR effects 584 include real-world scale tree 584a at distance 594b from display screen 554 and situated laterally adjacent to display screen 554, as well as real-world scale boulder 584b. Intermediate scale AR boulders 585a and 585b correspond to real-world scale AR boulder 584b but have their respective scales interpolated based on the relative distances of intermediate scale AR boulders 585a and 585b from display screen 554, as well as their relative proximities to AR device 502.

As shown in FIG. 5B, intermediate scale AR effects 585a and 585b are scaled to appear larger with increasing distance from display screen 554 and proximity to AR device 502. That is to say, for example, the size of intermediate scale AR boulder 585a appears larger than intermediate scale AR boulder 585b because intermediate scale AR boulder 585a is both more distant from display screen 554 and closer to AR device 502. Moreover intermediate scale AR boulder 585b appears smaller than intermediate scale AR boulder 585a because intermediate scale AR boulder 585b is both closer to display screen 554 and farther from AR device 502. However, it is noted that, in contrast to the dynamic scaling of intermediate scale AR effects 585a and 585b, which appear larger/smaller in size as their respective distances from display screen 554 increase/decrease, or as their respective proximities to AR device 502 increase/decrease, the scale of display screen scale AR effects 582 is tied to the scale of images displayed on display screen 554.

Moving to FIG. 5C, diagram 500C shows AR device 502 at distance 594a from display screen 554 displaying media content 552, as well as user 501 of AR device 502. However, according to the use case depicted in FIG. 5C, the position of AR device 502 in relation to display screen 554 has changed relative to its position in FIG. 5B because the viewing angle of AR device 502 in relation to the display surface of display screen 554 has changed from a viewing angle of substantially 90°, i.e., perpendicular to the display surface of display screen 554, to a viewing angle of less than approximately 15° above the display surface of display screen 554.

It is noted that the position and orientation of AR device 502 in relation to display screen 554 changes when distance 594a changes, when the viewing angle of AR device 502 in relation to the display surface of display screen 554 changes, or when both of distance 594a and the viewing angle of AR device 502 in relation to the display surface of display screen 554 change. That is to say, the position and orientation of AR device 502 in relation to display screen 554 is a function of the distance of AR device 502 from display screen 554 and the viewing angle of AR device 502 when viewing display screen 554. Thus, the position of AR device 502 is the distance between display screen 554 and AR device 502 and informs the interpolated scale of the AR effect(s). The orientation of AR device 502 is the relative orientation between AR device 502 and display screen 554. It is noted that it is not enough to know position alone, because in some use cases AR device 502 may remain still while display screen is rotated to the left or right via its wall mount. The relative position of AR device 502 in relation to display screen 554 remains the same in that case, but the relative orientations change, thereby affecting the scaling and rendering of the AR effect(s).

It is further noted that real-word scale AR effects can transform to intermediate scale AR effects, and vice versa, as the position and orientation of AR device 502 changes in relation to display screen 554. That is to say, an intermediate scale AR effect from one perspective can appear far enough removed from display screen 554 or close enough to user 501 from another perspective to be rendered as a real-world scale AR effect. Analogously, a real-world scale AR effect from one perspective can appear closer to display screen 554 or farther from user 501 from another perspective, and may be rendered as an intermediate scale AR effect.

Referring to FIG. 5C in combination with FIGS. 1, 5A, and 5B, under the circumstances depicted in FIG. 5C. AR device 502 may dynamically generate AR effect(s) 180/580 in FIGS. 1 and 5A that include one or more display screen scale AR effects 582 corresponding to display screen AR effects 582a and 582b, in FIG. 5A, and one or more intermediate scale AR effects, represented in FIG. 5C by intermediate scale tree 585 at distance 594c from display screen 554 and situated in front of display screen 554. Also shown in FIG. 5C is background 596 relative to the perspective of AR device 502 in FIG. 5C.

According to FIG. 5C, the change in position and orientation of AR device 502 relative to its position and orientation in FIG. 5B cause real-world scale AR tree 584a in FIG. 5B to be rendered as intermediate scale AR tree 585 in FIG. 5C. However, as in FIG. 5B, in contrast to the dynamic scaling of intermediate scale AR tree 585, which appears larger/smaller in size as its distance from display screen 554 increases/decreases, or as its proximity to AR device 502 increases/decreases, the scale of display screen scale AR effects 582, as well as any AR effects 580 in background 596, are tied to the scale of images displayed on display screen 554.

In some implementations, the method outlined by flowchart 360 may conclude with action 365 described above. However, in other implementations, processing hardware 104 of AR device 102 may further execute software code 110 to generate one or more audio effects corresponding to AR effect(s) 180/580; one or more haptic effects corresponding to AR effect(s) 180/580; or one or more audio effects and one or more haptic effects corresponding to AR effect(s) 180/580 (action 366). In those implementations, the method outlined by flowchart 360 may further include, outputting, by software code 110 executed by processing hardware 104, while rendering AR effect(s) 180/580 on display 242/542 of AR device 102, the one or more audio effects using audio speaker(s) 244 and/or rendering the one or more haptic effects using haptic actuator(s) 248. Alternatively, or in addition, processing hardware 104 of AR device 102 may further execute software code 110 to detect one or more Internet of Things (IoT) connected devices in the environment in which display screen 154/554 is located, and may activate those one or more IoT connected devices to produce ambient effects, such as lighting, temperature, aromas, and the like, to further enhance media content 152/552 while AR effect(s) 180/580 are being rendered.

With respect to the method outlined by flowchart 360, it is emphasized that actions 361, 362, 363, 364, and 365 (hereinafter "action 361-365"), or actions 361-365 and 366, may be performed as an automated method.

Thus, as described above, the present application discloses systems and methods for providing dynamic scale AR enhancement of images. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    an augmented reality (AR) device having a display, a processing hardware, and a memory storing a software code;
    the processing hardware configured to execute the software code to:
        monitor a sequence of images being displayed on a display screen separate from the AR device;
        identify, based on monitoring the sequence of images being displayed on the display screen, an image in the sequence of images as an anchor image, wherein the anchor image is: (i) a predetermined image included in the sequence of images, or (ii) algorithmically detected from among the sequence of images during display of the sequence of images;
        obtain, using the anchor image, one or more AR effects associated with the anchor image;
        determine a position and an orientation of the AR device in relation to the display screen; and
        render, based on the position and the orientation of the AR device in relation to the display screen, the one or more AR effects on the display of the AR device;
        wherein the one or more AR effects comprise at least one intermediate scale AR effect having a scale intermediate between a display screen scale AR effect and a real-world scale AR effect.

2. The system of claim 1, wherein the one or more AR effects further comprise the display screen scale AR effect, and wherein the display screen scale AR effect is spatially and temporally aligned with the sequence of images being displayed on the display screen.

3. The system of claim 2, wherein the processing hardware is further configured to execute the software code to:
    receive a display parameter of the display screen displaying the sequence of images; and
    render the display screen scale AR effect on the display of the AR device using the display parameter of the display screen.

4. The system of claim 1, wherein the intermediate scale AR effect is scaled to appear larger with increasing distance from the display screen and with increasing proximity to the AR device.

5. The system of claim 1, wherein the processing hardware is further configured to execute the software code to:
    detect a color palette of a real-world environment of the display screen displaying the sequence of images; and
    render the intermediate scale AR effect on the display of the AR device using the detected color palette.

6. The system of claim 5, wherein an influence of the detected color palette on the rendering of the intermediate scale AR effect diminishes as the scale of the intermediate scale AR effect approaches a scale of the real-world scale AR effect.

7. The system of claim 1, wherein the position of the AR device in relation to the display screen is determined based on a distance of the AR device from the display screen, and the orientation of the AR device in relation to the display screen is determined based on a viewing angle of the AR device in relation to the display screen.

8. The system of claim 1, wherein the anchor image comprises one of the sequence of images, a portion of the one of the sequence of images, or one of multiple anchor images in the sequence of images.

9. The system of claim 1, wherein when rendering the one or more AR effects, the anchor image serves as a two-dimensional image template for overlaying the one or more AR effects thereon or for extending the one or more AR effects therefrom into an environment where the display screen is located.

10. The system of claim 1, wherein the AR device further comprises at least one of an audio speaker or a haptic actuator, and wherein the processing hardware is further configured to execute the software code to:
generate at least one of an audio effect or a haptic effect corresponding to at least one of the one or more AR effects; and
output, while rendering the at least one of the one or more AR effects on the display of the AR device, at least one of the audio effect using the audio speaker or the haptic effect using the haptic actuator.

11. A method for use by a system including an augmented reality (AR) device having a display, processing hardware, and a memory storing a software code, the method comprising:
monitoring, by the software code executed by the processing hardware, a sequence of images being displayed on a display screen separate from the AR device;
identifying, by the software code executed by the processing hardware based on monitoring the sequence of images being displayed on the display screen, an image in the sequence of images as an anchor image, wherein the anchor image is: (i) a predetermined image included in the sequence of images, or (ii) algorithmically detected from among the sequence of images during display of the sequence of images;
obtaining, by the software code executed by the processing hardware and using the anchor image, one or more AR effects associated with the anchor image;
determining, by the software code executed by the processing hardware, a position and an orientation of the AR device in relation to the display screen; and
rendering, by the software code executed by the processing hardware based on the position and the orientation of the AR device in relation to the display screen, the one or more AR effects on the display of the AR device;
wherein the one or more AR effects comprise at least one intermediate scale AR effect having a scale intermediate between a display screen scale AR effect and a real-world scale AR effect.

12. The method of claim 11, wherein the one or more AR effects further comprise the display screen scale AR effect, and wherein the display screen scale AR effect is spatially and temporally aligned with the sequence of images being displayed on the display screen.

13. The method of claim 12, further comprising:
receiving, by the software code executed by the processing hardware, a display parameter of the display screen displaying the sequence of images; and
rendering, by the software code executed by the processing hardware, the display screen-scale AR effect on the display of the AR device using the display parameter of the display screen.

14. The method of claim 11, wherein the intermediate scale AR effect is scaled to appear larger with increasing distance from the display screen and with increasing proximity to the AR device.

15. The method of claim 11, further comprising:
detecting, by the software code executed by the processing hardware, a color palette of a real-world environment of the display screen displaying the sequence of images; and
rendering, by the software code executed by the processing hardware, the intermediate scale AR effect on the display of the AR device using the detected color palette.

16. The method of claim 15, wherein the influence of the detected color palette on the rendering of the intermediate scale AR effect diminishes as the scale of the intermediate scale AR effect approaches a scale of the real-world scale AR effect.

17. The method of claim 11, wherein determining the position of the AR device in relation to the display screen is based on a distance of the AR device from the display screen, and the orientation of the AR device in relation to the display screen is determined based on a viewing angle of the AR device in relation to the display screen.

18. The method of claim 11, wherein the anchor image comprises one of the sequence of images, a portion of the one of the sequence of images, or one of multiple anchor images in the sequence of images.

19. The method of claim 11, wherein when rendering the one or more AR effects, the anchor image serves as a two-dimensional image template for overlaying the one or more AR effects thereon or for extending the one or more AR effects therefrom into an environment where the display screen is located.

20. The method of claim 11, wherein the AR device further comprises at least one of an audio speaker or a haptic actuator, the method further comprising:
generating, by the software code executed by the processing hardware, at least one of an audio effect or a haptic effect corresponding to at least one of the one or more AR effects; and
outputting, by the software code executed by the processing hardware while rendering the at least one of the one or more AR effects on the display of the AR device, at least one of the audio effect using the audio speaker or the haptic effect using the haptic actuator.

* * * * *